United States Patent [19]

Hadar et al.

[11] Patent Number: 5,601,381
[45] Date of Patent: Feb. 11, 1997

[54] IRRIGATION APPARATUS INCLUDING PULSATORS

[75] Inventors: Yoram Hadar, Ramat; Noam Lemelshtrich, Herzlia Pituah, both of Israel

[73] Assignee: Lego Irrigation Ltd., Natania, Israel

[21] Appl. No.: 522,443

[22] Filed: Aug. 31, 1995

[30] Foreign Application Priority Data

Sep. 4, 1994 [IL] Israel ........................................ 110856

[51] Int. Cl.⁶ .................................................. E02B 13/00
[52] U.S. Cl. .................. 405/43; 405/36; 405/45
[58] Field of Search ..................... 405/36–51, 52, 405/80; 239/542, 547, 533.1, 533.4, 201, 207, 450; 137/624.14, 236.1

[56] References Cited

U.S. PATENT DOCUMENTS

| | | |
|---|---|---|
| Re. 28,095 | 7/1974 | Chapin . |
| 1,761,281 | 6/1930 | Taub . |
| 3,302,408 | 2/1967 | Schmid . |
| 3,630,448 | 12/1971 | Chapin ............................ 239/547 X |
| 3,698,195 | 10/1972 | Chapin ................................. 405/43 |
| 3,866,833 | 2/1975 | Shibata et al. . |
| 3,917,530 | 11/1975 | Boske . |
| 3,954,223 | 5/1976 | Wichman et al. .................. 239/542 X |
| 4,009,832 | 3/1977 | Tiedt . |
| 4,022,384 | 5/1977 | Hoyle et al. ............................. 405/43 |
| 4,059,230 | 11/1977 | Rosenberg .............................. 239/542 |
| 4,123,006 | 10/1978 | Yukishita . |
| 4,162,041 | 7/1979 | Hane ................................... 239/450 X |
| 4,175,882 | 11/1979 | Gilead ....................................... 405/43 |
| 4,188,154 | 2/1980 | Izatt . |
| 4,274,583 | 6/1981 | Hunter ............................... 239/207 X |
| 4,371,113 | 2/1983 | Ross ...................................... 239/201 |
| 4,548,360 | 10/1985 | Delmer et al. . |
| 4,609,154 | 9/1986 | Rinkewich . |
| 5,353,993 | 10/1994 | Rosenberg .............................. 239/542 |

FOREIGN PATENT DOCUMENTS

WO9011681  10/1990  WIPO .

*Primary Examiner*—Dennis L. Taylor
*Attorney, Agent, or Firm*—Benjamin J. Barish

[57] ABSTRACT

Irrigation apparatus includes a feeder line connectible to a source of pressurized water, and an outer line of larger diameter than, and enclosing, the feeder line to define an annular water chamber between them. The outer line includes a plurality of irrigation devices spaced along its length communicating with the water chamber. A plurality of pulsator devices are spaced along the length of the feeder line and connect the feeder line to the water chamber.

19 Claims, 3 Drawing Sheets

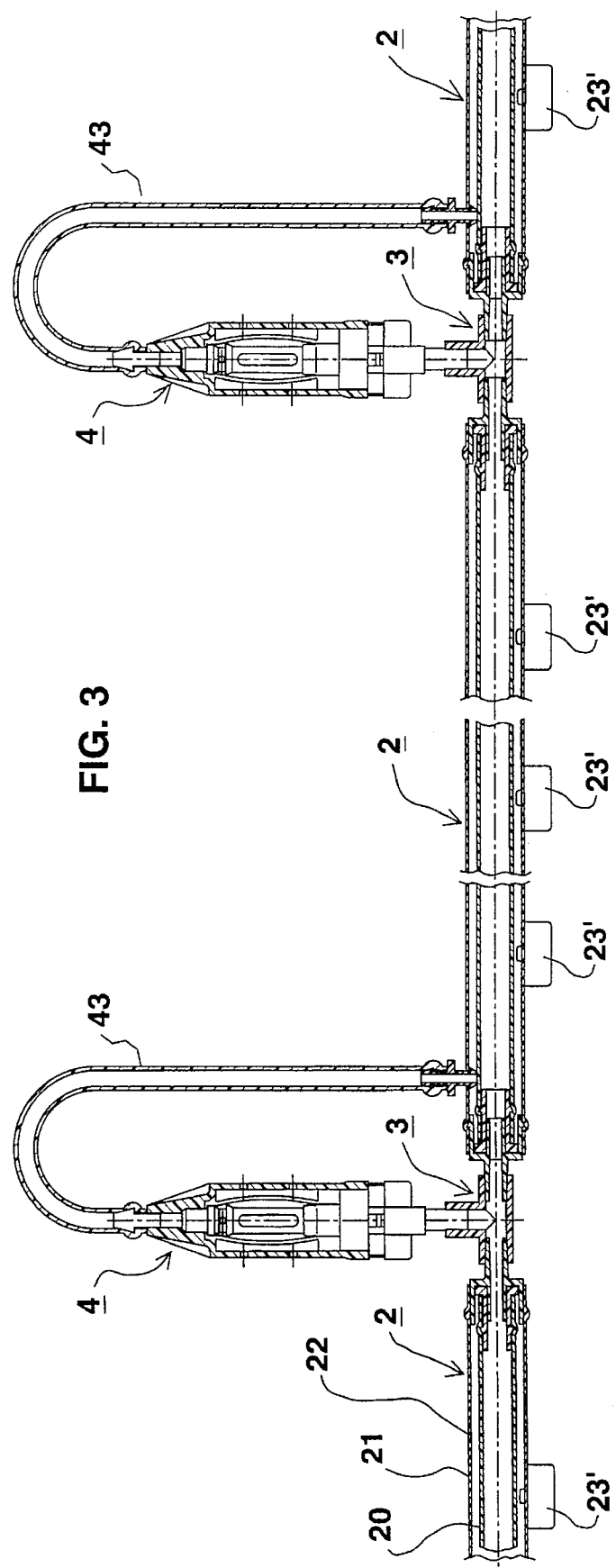

IRRIGATION APPARATUS INCLUDING PULSATORS

FIELD AND BACKGROUND OF THE INVENTION

The invention relates to irrigation apparatus and particularly to such apparatus which includes pulsators. The invention is especially useful with respect to dripper-type irrigation apparatus, and is therefore described below with respect to this application.

The growing use of artificial bedding in nurseries and open fields, and particularly the use of soils with very low water retaining capacity, have created a need for irrigation apparatus having very low discharge rates, of the order 0.1–0.3 liters per hour. Such low discharge rates allow the water to travel by capillary action, and thus increase the water retaining capacity of the plant growing media. Providing low water discharge rates also effects significant savings of water and fertilizer. The use of pulsator devices, such as described in U.S. Pat. Nos. 4,781,217 and 4,949,747 of Peretz Rosenberg or 4,955,539 of G. Ruttenberg, have been found to allow lower discharge rates to be used permitting significant savings of water and fertilizer.

One recent technique for using pulsators to lower the water discharge rate, described in U.S. Pat. No. 5,353,993, includes a feeder line for supplying the water and a dripper line connected to the feeder line via a plurality of spaced pulsator devices. However, using two separate lines is expensive and cumbersome, and moreover, requires drippers with small passages.

OBJECTS AND BRIEF SUMMARY OF THE INVENTION

An object of the present invention is to provide irrigation apparatus having advantages in the above respects as will be described more particularly below.

According to one aspect of the present invention, there is provided irrigation apparatus comprising: a feeder line connectible to a source of pressurized water; an outer line of larger diameter than, and enclosing, the feeder line to define an annular water chamber between the outer line and the feeder line; the outer line including a plurality of irrigation devices spaced along its length communicating with the water chamber; and a plurality of pulsator devices spaced along the length of the feeder line and connecting the feeder line to the water chamber.

According to further features in the described preferred embodiment, the outer line is constituted of a plurality of outer pipes spaced along the length of, and enclosing, the feeder line, each of the outer pipes including end walls to define an annular water chamber between the respective outer pipe and the feeder line.

According to still further features in the described preferred embodiment, the outer pipes are dripper pipes, and the irrigation devices are water drippers. Also, the feeder line includes a plurality of feeder pipes, one for each of the outer pipes, and a plurality of connectors connecting each feeder pipe to the adjacent feeder pipe and pulsator device.

As will be described more particularly below, irrigation apparatus constructed in accordance with the foregoing features is relatively simple to apply in the field since it requires deployment of only a single line, rather than two separate lines. Moreover, since the inner feeder pipe is within, and therefore occupies a substantial volume of, the outer dripper pipe, the annular water chamber produced between the two pipes is of relatively low volume, thereby permitting larger passageways in the dripper devices, or in microsprinklers if used as the irrigation devices. Primarily for the latter reason, irrigation apparatus constructed in accordance with the foregoing features may employ standard, conventional drippers which can be produced and assembled in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein:

FIG. 3 illustrates another type of irrigation apparatus constructed in accordance with the present invention.

DESCRIPTION OF PREFERRED EMBODIMENTS

Figure 1:
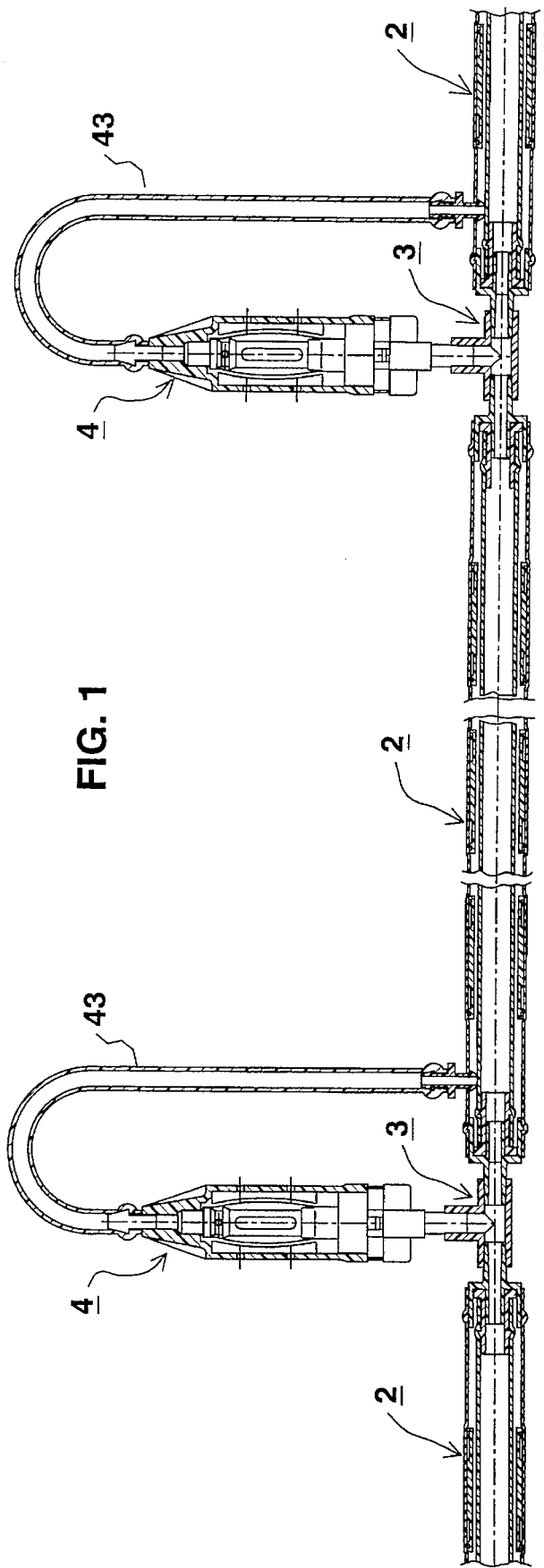
FIG. 1 illustrates one form of irrigation apparatus constructed in accordance with the present invention.
Figure 2:
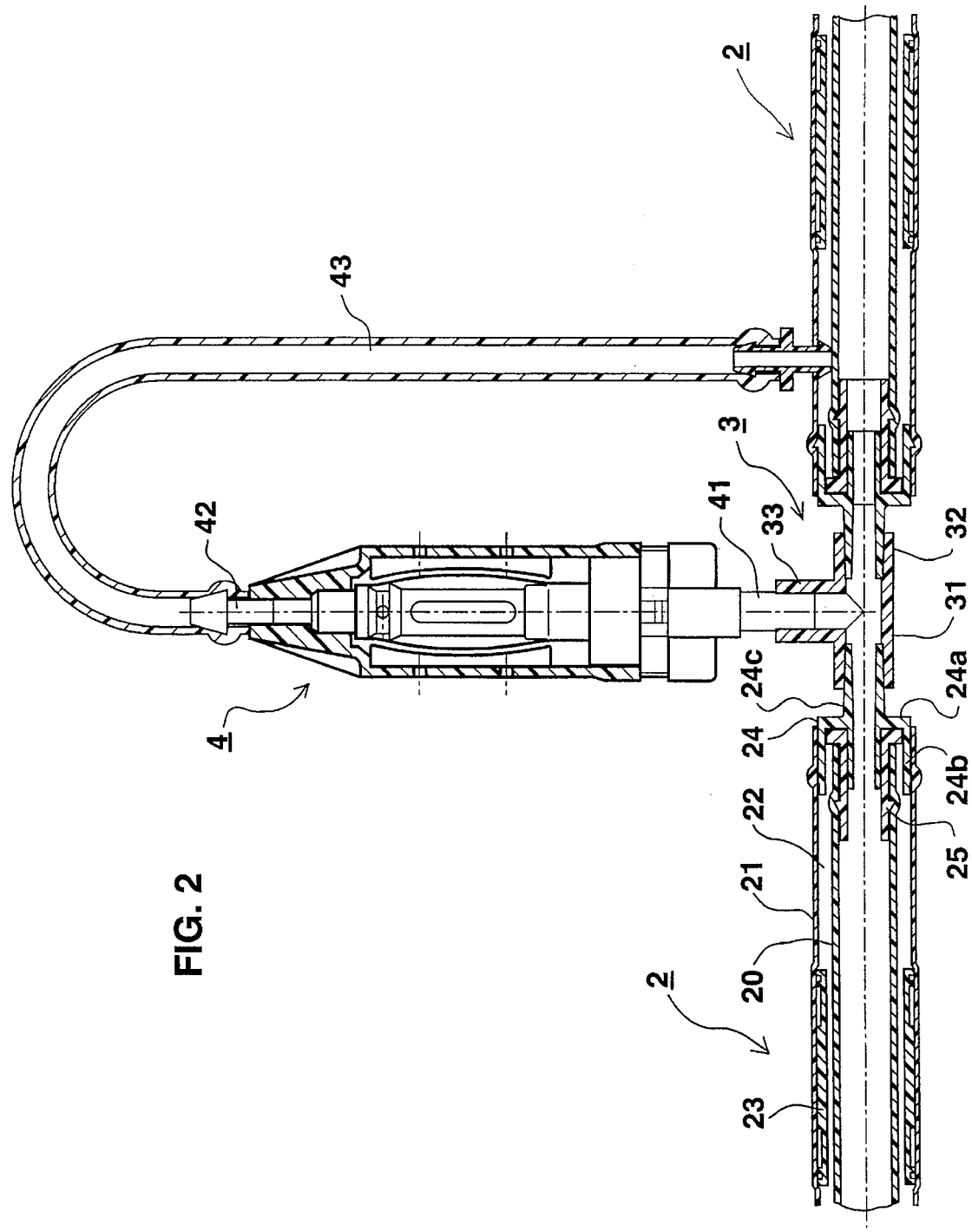
FIG. 2 is an enlarged fragmentary view of the apparatus of FIG. 1.

The irrigation apparatus illustrated in FIGS. 1 and 2 includes a plurality of irrigation pipe assemblies of like construction each generally designated 2, connected together at their ends by T-connectors 3. As will be described more particularly below, each irrigation pipe assembly 2 includes a plurality of irrigation devices, in this case water drippers. A plurality of pulsators 4, connected between the T-connectors 3 and the irrigation pipe assemblies 2, supply water in the form of pulses, and in parallel paths, to the irrigation devices within the pipe assemblies 2.

The pulsator devices 4 may be of any of the known constructions, such as described in the previously-cited Rosenberg and Ruttenberg patents. The details of the construction and operation of such pulsator devices are therefore not set forth herein since they do not form a part of the present invention.

The construction of each of the irrigation pipe assemblies 2 is more particularly seen in FIG. 2. Each irrigation pipe assembly 2 includes an inner feeder pipe 20 and an outer pipe 21 of larger diameter than pipe 20 to define an annular water chamber 22 between the two pipes. The outer pipe 21 carries a number of irrigation devices, in this case drippers 23, in communication with the water chamber 22.

Each end of each irrigation pipe assembly 2 is closed by an end cap 24 including a transversely-extending end wall 24a, an axially-extending collar 24b attached to the outer pipe 21, and a hollow stem 24c extending centrally through end wall 24a. Another collar 25 attached to the inner feeder pipe 20 is secured between its outer collar 24b and inner hollow stem 24c to thereby close the respective end of the water chamber 22 defined between the two pipes 20, 21.

The T-connectors 3 includes three legs 31, 32, 33. Legs 31, 32 are coaxial to each other and to the axes of the two adjacent pipe assemblies 2, and receive the hollow stems 24c of the two adjacent pipe assemblies. Leg 33 is perpendicular to legs 31, 32, and receives the inlet end 41 of the pulsator device 4. The outlet end 42 of the pulsator device is connected by a tube 43 to the water chamber 22 of the next adjacent pipe assembly 2. The water within the annular water chambers 22 is discharged via the dripper devices 23 carried by the outer pipes 21.

It will be seen that legs 31, 32 of the T-connectors 3 connect all the feeder pipes 20 to form a common feeder line. One end of the feeder line is connectible to a source of pressurized water, and the opposite end of the feeder line is closed. It will also be seen that the outer pipes 21 of the pipe assemblies 2, being of larger diameter than the feeder pipes 20, define annular water chambers between the two pipes 20, 21 in each pipe assembly 2, which water chambers are closed by the end caps 24.

It will be further seen that the pulsator devices 4, having their inlet ends connected to the T-connectors 3 between pipe assemblies 2 and their outer ends connected by tubes 43 to the annular water chamber 22 of the next adjacent pipe assembly, define parallel paths for the water to flow from the feeder pipes 20 to the water chambers 22. The pulsator devices 4 thus direct the water, in the form of pulses, from the feeder pipes 20 to the water chambers 22.

Since the pulsator devices pass the water into the water chambers 22 intermittently in the form of pulses, rather than continuously, and since the volume of the annular water chambers 22 is relatively small (being the difference between the volume defined by the inner surface of the outer pipe 21 and the outer surface of the inner feeder pipe 20), the illustrated construction permits very low discharge rates to be produced from the dripper devices 23 even though such driper devices have relatively large passageways and thereby a low sensitivity to clogging.

The dripper devices 23 may be any of the known constructions with or without pressure-compensation, e.g., as described in U.S. Pat. Nos. 3,981,452, 4,281,798, 4,307,841, 4,687,143 or 5,236,130. However, if pressure-compensated pulsators are used, each section of the line defined by a pipe assembly 2 becomes pressure compensated, thereby obviating the need for pressure compensation in the dripper devices.

FIG. 3 illustrates a system as described above with respect to FIGS. 1 and 2, in which the dripper devices carried by the outer tubes 21 are off-line dripper devices, as shown at 23', attachable in discharge openings formed in the outer tubes 21 of the pipe assemblies 2. Except for this difference, the structure and operation of the apparatus illustrated in FIG. 3 is the same as described above with respect to FIGS. 1 and 2, and therefore corresponding reference numerals have been used to identify corresponding parts.

While the irrigation apparatus of the present invention is particularly useful with dripper irrigation devices, it may also be used with other types of irrigation device, such as microsprinklers. Many other variations, modifications and applications of the will be apparent.

We claim:

1. Irrigation apparatus, comprising:
   a feeder line connectible to a source of pressurized water;
   an outer line of larger diameter than, and enclosing, said feeder line to define an annular water chamber between the outer line and the feeder line;
   said outer line including a plurality of irrigation devices spaced along its length communicating with said water chamber;
   and a plurality of pulsator devices spaced along the length of the feeder line and connecting the feeder line to said water chamber.

2. The irrigation apparatus according to claim 1, wherein said outer line is constituted of a plurality of outer pipes spaced along the length of, and enclosing, said feeder line, each of said outer pipes including end walls to define an annular water chamber between the respective outer pipe and said feeder line.

3. The irrigation apparatus according to claim 1, wherein said outer pipes are dripper pipes, and said irrigation devices are water drippers integrally formed with said dripper pipes.

4. The irrigation apparatus according to claim 1, wherein said irrigation devices are water drippers attached off-line to said outer pipes.

5. The irrigation apparatus according to claim 1, wherein said feeder line includes a plurality of feeder pipes, one for each of said outer pipes, and a plurality of connectors connecting each feeder pipe to the adjacent feeder pipe and pulsator device.

6. The irrigation apparatus according to claim 5, wherein each of said connectors is a T-connector, including two legs connected to the adjacent feeder pipes, and a third leg connected to the adjacent pulsator device.

7. Irrigation apparatus, comprising:
   a feeder line connectible to a source of pressurized water;
   an outer dripper line spaced along the length of, and enclosing, said feeder line to define an annular water chamber between it and the feeder line;
   said outer line including a plurality of dripper devices spaced along its length communicating with said water chamber;
   and a plurality of pulsator devices spaced along the length of the feeder line and connecting the feeder line via parallel paths to said water chamber.

8. The irrigation apparatus according to claim 7, wherein said outer line is constituted of a plurality of outer pipes spaced along the length of, and enclosing, said feeder line, each of said outer pipes including end walls to define an annular water chamber between the respective outer pipe and said feeder line.

9. The irrigation apparatus according claim 8, wherein said feeder line includes a plurality of feeder pipes, one for and enclosed by each of said outer pipes, and a plurality of connectors connecting each feeder pipe to the adjacent feeder pipe and pulsator device.

10. The irrigation apparatus according to claim 9, wherein each of said connectors is a T-connector, including two legs connected to the adjacent feeder pipes, and a third leg connected to the adjacent pulsator device.

11. The irrigation apparatus according to claim 7, wherein said dripper devices are integrally formed with said outer line.

12. The irrigation apparatus according to claim 7, wherein said dripper devices are attached off-line to said outer line.

13. An irrigation pipe assembly, comprising:
   an inner feeder pipe;
   an outer pipe of larger diameter than said inner feeder pipe to define an annular water chamber between the two pipes;
   irrigation devices carried by said outer pipe in communication with said water chamber;
   end walls between said pipes at the opposite ends thereof for closing said annular water chamber between the two pipes, but providing a passage of the water from one feeder pipe to the next to be connected thereto;
   an inlet through the outer pipe for introducing water into said water chamber;

and a connector for connecting the inner feeder pipe to the feeder pipe of another like irrigation pipe assembly and to the water chamber thereof.

14. The irrigation pipe assembly according to claim 13, further including a pulsator device connected between the feeder pipe and the inlet to said water chamber.

15. The irrigation pipe assembly according to claim 14, wherein said drippers are integrally formed with said outer pipe.

16. The irrigation pipe assembly according to claim 14, wherein said drippers are attached off-line to said outer pipe.

17. The irrigation pipe assembly according to claim 14, wherein said irrigation devices are drippers.

18. The irrigation pipe assembly according to claim 17, wherein said drippers are integrally formed with said outer pipe.

19. The irrigation pipe assembly according to claim 17, wherein said drippers are attached off-line to said outer pipe.

* * * * *